Sept. 25, 1951

J. SELZ 2,568,768

RADIO DIRECTION FINDING SYSTEM

Filed Aug. 6, 1947

INVENTOR
JACQUES SELZ

BY R. P. Morris

ATTORNEY

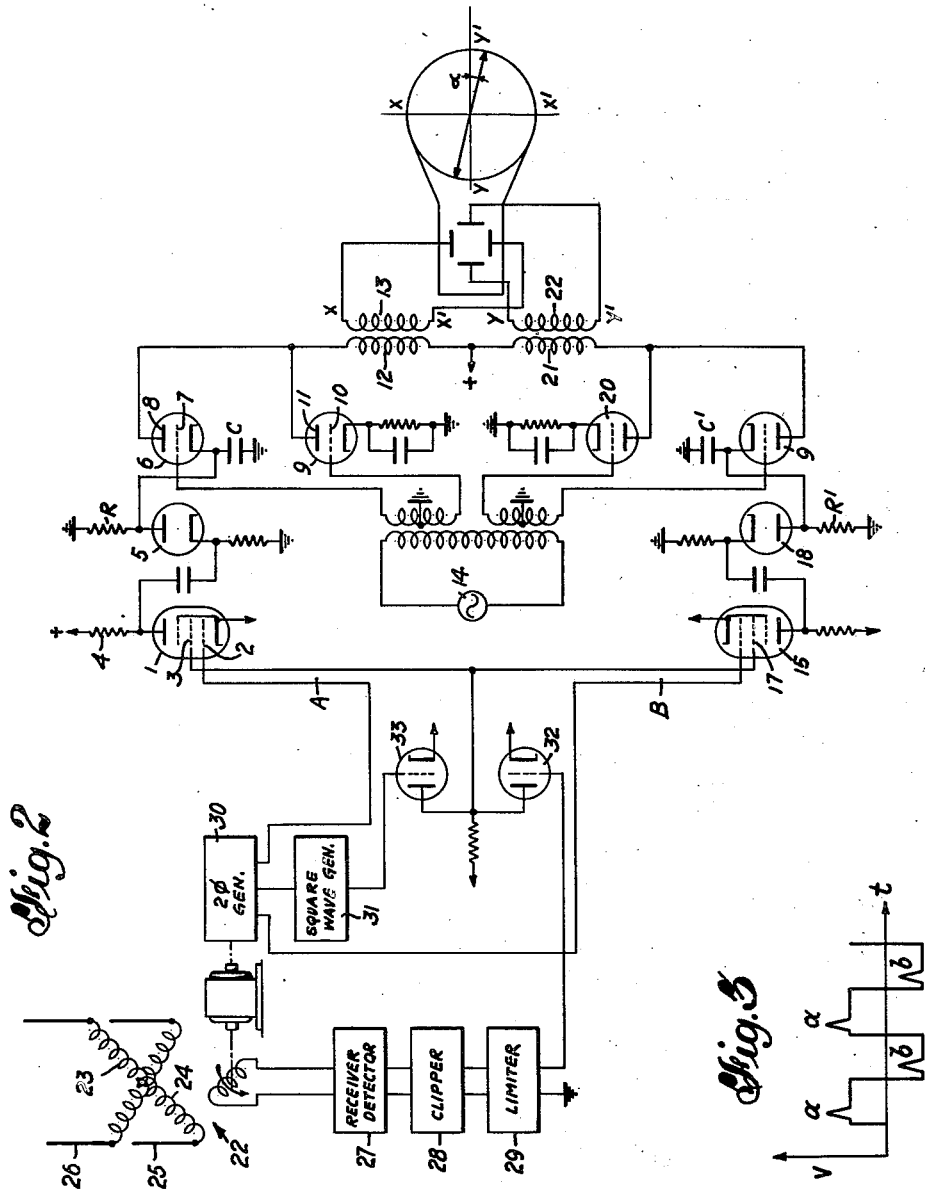

INVENTOR
JACQUES SELZ
BY R.P. Morris
ATTORNEY

Patented Sept. 25, 1951

2,568,768

UNITED STATES PATENT OFFICE 2,568,768

RADIO DIRECTION FINDING SYSTEM

Jacques Selz, Paris, France, assignor to International Standard Electric Corporation, New York, N. Y., a corporation of Delaware Application August 6, 1947, Serial No. 766,775
In France December 29, 1945

Section 1, Public Law 690, August 8, 1946
Patent expires December 29, 1965

6 Claims. (Cl. 343—118)

The present invention relates to radio direction finding devices, and particularly to devices of this kind that give indications on a cathode ray tube.

Radio direction finding makes it possible to determine the direction in which a transmitting station is located. When this station is on board an airplane, it keeps moving, so that it is necessary to obtain the result within a very short space of time, especially if the purpose of the measurement is to determine the position of the airplane in flight and make it known to the same.

One of the objects of the present invention is to make is possible to obtain an immediate and easily readable result of the determination of the direction in which a transmitting station is situated.

The indication is given on a cathode ray tube in the form of a continuously illuminated diameter, which is consequently very luminous. The luminous diameter forms with the reference diameter an angle equal to the angle formed by the direction in which the transmitting station happens to be with respect to a fixed or reference direction.

The rapidity with which the results are obtained and their shape make is possible to have intermittent transmissions. The diameter is only illuminated during the transmission, and this indicates the transmission at the same time as the direction of the airplane.

It is evident however that the use of the invention is not limited to aviation, and that it may be employed for any stationary or mobile transmitting station.

According to certain of its features, the invention provides a radio direction finding base comprising antennas, and a continuously rotating finder associated to a generator of 2-phase currents that is keyed on the same shaft. The high frequency currents modulated by the rotation of the finder are employed, at the time of the radiogoniometric extinctions or nulls, for producing impulses that are applied to two modulation tubes disposed in the circuits of the 2-phase generator. The modulation tubes thus permit passage of the 2-phase currents only for the duration of these direction finding impulses, and with amplitudes that are dependent on the phase of these currents at the time when these impulses are produced.

By means of suitable time constant circuits, these impulses are tranformed into two continuous control voltages having values that accordingly are dependent on the amplitude of the 2-phase reference currents at the moment when the direction finding impulse is produced. These two voltages are employed for obtaining a continuously illuminated diameter on a cathode ray oscillograph by acting on an auxiliary oscillator.

The staggered arrangments of the various stages that lead transmission signals to illuminate the diameter in the cathode ray oscillograph is shown schematically in the series of graphs given in Fig. 1.

In order to avoid repititions, an explanation of these various stages will be given when describing the embodiment of the present invention by way of example.

According to other features of the invention, instead of employing a 2-phase generator disposed on the same shaft as the goniometric finder, the finder is provided with a contact that sends an impulse when it pases over a certain position. The said impulse, which may be transmitted to a distance over the same tranmission channel as the radiogoniometric currents proceeding from the finder, is employed for producing in the observation station two 2-phase sinusoidal alternating currents, which are employed as above for obtaining an indication of the direction of the transmitting station in the form of a continuously illuminated diameter.

The present invention will be described with reference to one example of embodiment illustrated in the appended drawings, in which:

Fig. 2 shows a circuit that makes it possible to employ the abovementioned impulses for the purpose of illuminating the diameter.

Fig. 3 shows, by way of a curve, one of the means for suppressing one of the direction finding impulses.

Figure 1:
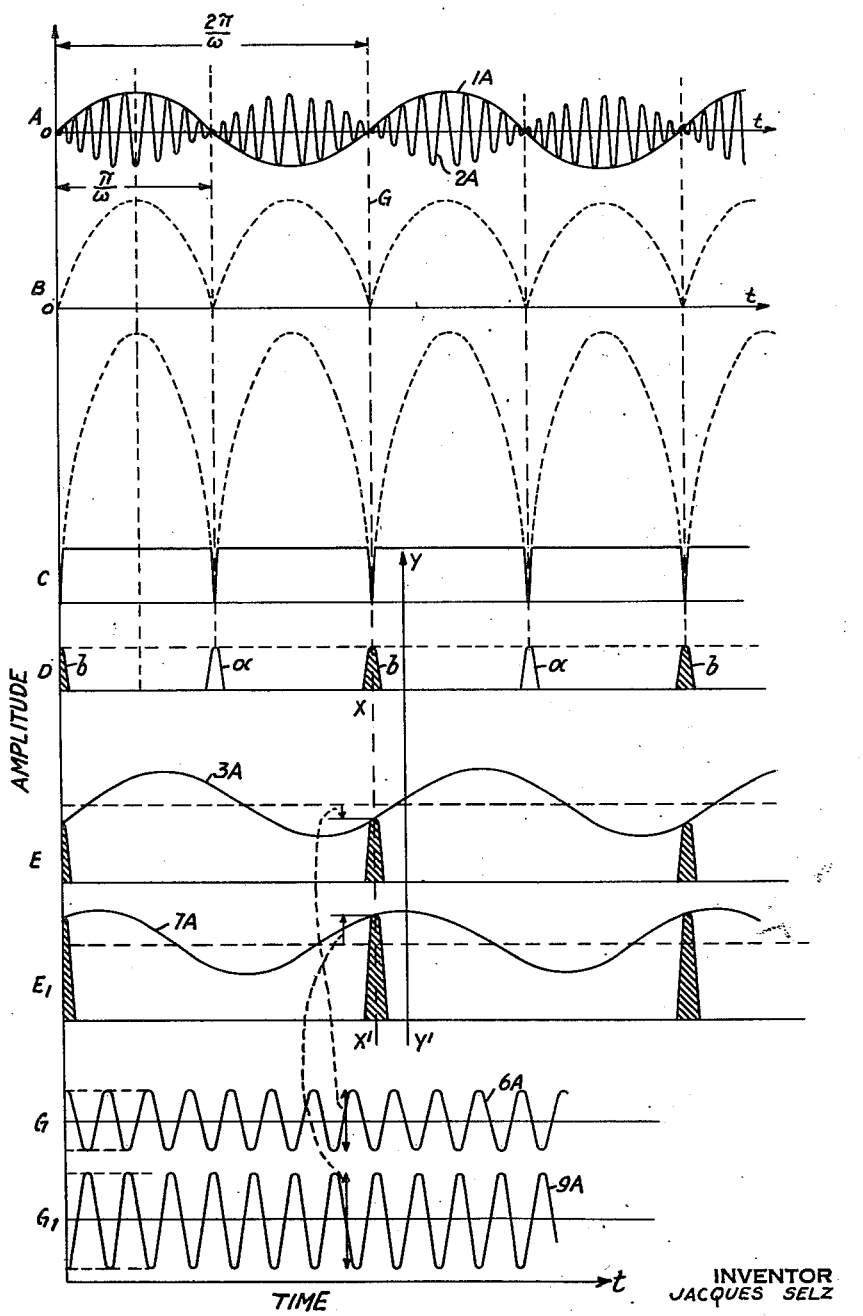
Fig. 1 shows, as already seen, the various modifications undergone by the signals.

The example of embodiment relates to application of the features of the invention to a radio direction finding base operating with automatic direction finding, and comprising aerials of the Adcock type, for example.

As known in the art, a radio direction finding base of this kind is essentially comprised of a rotating finder 22 (Fig. 2) whose two stators 23, 24 are fed by the aerials 25, 26 and whose rotor is connected to an amplifier and a detector 27.

The high frequency current of pulsation $\omega/2\pi$ is modulated by the rotation of the finder under control of motor 28 at a pulsation $\Omega$, and the current obtained is of the shape $\sin \omega t \sin \Omega t$ for a suitable phase origin, as is well known. This current is shown by curves 1A and 2A respectively in the graph A of Fig. 1.

After amplification, detection and filtering, there is obtained at the output of the amplifier 27 (Fig. 2) a current of undulatory shape having the algebraic expression: absolute value $\sin \omega t$, and it is shown in graph B of Fig. 1.

By amplifying and de-peaking the thus obtained current in the de-peaking stage 28, e. g. by means of a tube that comprises a high resistance in series with the grid, impulses are obtained from the abovementioned undulatory curve. These impulses are made of uniform amplitude by means of a limiting stage 29. These stages are shown in graphs C and D of Fig. 1.

One impulse out of two is suppressed, as will be described further on. In graph D of Fig. 1, the suppressed impulses are shown unshaded, and those that remain are shown shaded.

On the same shaft as the rotating finder there is disposed a 2-phase current generator 30 that furnishes two voltages which are staggered by 90° and which may be represented by $\sin (\omega t - a)$ and $\cos (\omega t - a)$. In graphs E and $E_1$ of Fig. 1, curves 3A and 7A respectively show the components $\sin (\omega t - a)$ and $\cos (\omega t - a)$ increased by one same additional constant.

The 2-phase current's period is equal to the modulation period produced by the rotation of the finder. However, the origin is not the same. This difference of origin makes it possible to determine the direction in which the transmitting station is located. In graphs E and $E_1$ of Fig. 1, the stagger is represented by the spacing between axis X—X' and axis Y—Y'.

The D signals are employed for illuminating a diameter on the oscillograph by means of the circuit shown in Fig. 2.

This circuit is made up of two channels. Channel A is assigned to the combination of the D signals with the first phase of the 2-phase current $\sin (\omega t - a)$. Channel B is assigned to the combination of the D signals with the second phase $\cos (\omega t - a)$.

Channel 1 consists of tubes 1, 5, 6, 9, and channel 2 of tubes 15, 18, 19, 20. Auxiliary oscillator 14 acts on the two channels.

The gain of tube 1 is made nil, either because its cathode is very positive relatively to its control grid, or because its screen, if a screen grid tube is used, is at a very low or zero potential. The above described impulses give tube 1 its normal gain by making its cathode less positive, or else by making its control grid or its screen more positive.

In the example shown in Fig. 2, the voltage $V_0 \sin (\omega t - a)$ proceeding from the 2-phase current generator 30 is applied to control grid 2, and the impulses corresponding to the extinctions are applied to screen 3.

In the anode of this tube there is disposed a charging resistance 4, and also a circuit of high time constant that consists of a condenser C and a high resistance R. This condenser is charged across a diode 5.

If tube 1 had a constant gain, there would be found in its plate circuit a voltage of the form $U = U_0 (1 + g \sin (\omega t - a))$, $g$ being a constant less than 1. This voltage U is represented by curve 3 in graph E of Fig. 1.

This tube only amplifies for a very short time while there are still D impulses, i. e. when $t=0$ or $t=k\pi$, $k$ being a whole number. Impulses of voltage $U = U_0 (1 - g \sin a)$ are obtained on the plate, of tube 1.

The voltage $U_0 (1 - g \sin a)$ is the constant voltage that is found at the terminals of condenser C, because it discharges an inappreciable amount between two impulses because of the time constant of circuit RC, and diode 5 permits passage of the quantity of electricity required to keep this charge at a constant level, so that condenser C is charged at a practically constant voltage $U_0 (1 - g \sin a)$.

The suppression of one D impulse out of two results in releasing tube 1 once for each rotation of the finder, and in only having one single value $U_0 (1 - g \sin a)$. Otherwise, there would alternately appear at the plate of tube 1 a voltage $U_0 (1 - g \sin a)$ and a voltage $U_0 (1 + g \sin a)$, and this would introduce a source of error.

This voltage is employed in a differential modulator for producing the voltage $V \sin \eta (t - t_0) \sin a$. This modulator consists of two tubes 6 and 9, whose grids 7 and 10 are excited in push-pull by the local oscillator of pulsation $\eta$. The arbitrary constants $\eta$ and $t_0$ indicate that oscillator 14 is independent of the finder and of the associated generator. Grid 7 of tube 6 receives the bias U proceeding from condenser C. Grid 10 of tube 9 has a fixed bias.

Plates 8 and 11 of tubes 6 and 9 are connected in parallel. Tube 6 is mounted as grid modulator. On plate 8 there is accordingly found a current of the form $V \sin \eta (t - t_0) (1 - m \sin a)$ with $m=1$. In plate 11 of tube 10 there is obtained a current of the shape $mV \sin \eta (t - t_0)$. In impedance 12 common to the two plates there is obtained the algebraic sum of the two currents, i. e. $V \sin \eta (t - t_0) (1 - m \sin a)$ and $mV \sin \eta (t - t_0) \sin a$. This is curve 6A of graph G of Fig. 1.

A second channel, mounted in the very same way, consists of tubes 15, 18, 19 and 20. Capacitance C' is equal to C, and resistance R' is equal to R. Tube 15 receives on its screen 17 the impulses synchronized with the goniometric extinctions in a similar manner to tube 1. To the grid 16 of tube 15 there is applied the voltage $U_0 \cos (\omega t - a)$ represented by curve 7 of graph $E_1$. In the same way as before, a current $mV \sin \eta (t - t_0) \cos a$ is obtained in impedance 21. The result is shown by curve 9A of graph $G_1$ (Fig. 1).

These voltages are transmitted to the two pairs of plates of the cathode ray tube by means of coupling windings 13 and 22 respectively. On the screen of the tube there is accordingly obtained a stationary diameter of slope $a$ (Fig. 2) traversed by the spot of pulsation $\eta$.

The process has been described for the case of application to a tube with plates, but it may also be applied to a magnetic deflection tube without departing from the scope of the invention.

It is to be noted that, owing to the finder and generator being keyed on the same shaft, the pulsation may vary without altering the results. The position of the diameter is independent of the variations of $\omega$.

Of the two impulses that correspond to the two extinctions for each rotation of the finder, one will be eliminated by means of a square signal extracted from the sinusoid sin $\omega t$ at 30, e. g. by amplification and de-peaking 31. The square signal is added to the impulses by tube 32 to which is applied the impulses and by tube 33 to the grid to which a square wave signal is applied. A current is obtained like that shown in Fig. 3. A threshold device makes it possible to eliminate the alternate impulses, and one impulse remains for each rotation of the finder.

Figure 4:
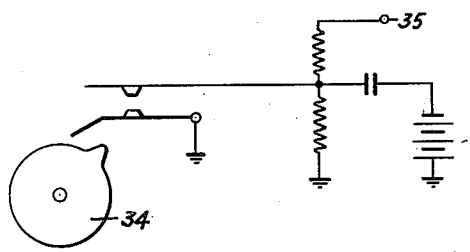
Fig. 4 shows a device that permits the replacement of the 2-phase generator by a reference impulse particularly in cases when it is desired to transmit the findings to a distance.
Figure 6:
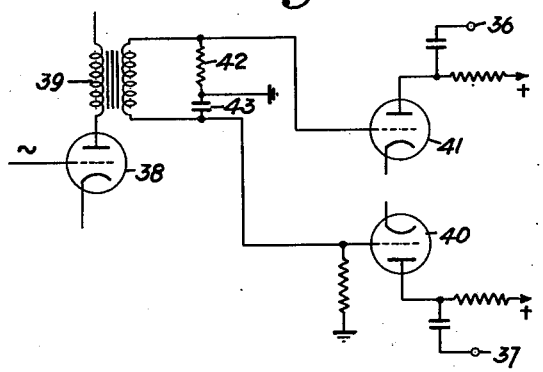
Fig. 6 shows an example of a circuit that makes it possible to obtain two sinusoidal currents displaced in phase by 90°.

Instead of using a 2-phase generator, it is possible to employ one impulse for each rotation of the finder. For example, a cam 34 secured to the shaft makes one contact for each rotation, as shown in Fig. 4. This results in an impulse at 35. From the thus obtained sequence of impulses, a sinusoidal current of pulsation $\omega$ is extracted by means of a suitable band pass filter. This current, when applied by a device similar to that shown in Fig. 6, furnishes at points 36 and 37 two 2-phase currents in quadrature. This is accomplished by applying a voltage current to the tube grid of 38. The output energy from tube 38 is applied over transformer 39 to the grids of tubes 40 and 41. By means of the circuit elements resistor 42 and condenser 43 the phase of the voltage applied to tubes 40 and 41 is shifted 90° so that phase quadrature currents are provided. The currents of $\sin(\omega t - a)$ and $\cos(\omega t - a)$ are thereupon employed like the currents furnished by the above mentioned generator through the grids 2 and 17 of tubes 1 and 15 respectively.

Figure 5:
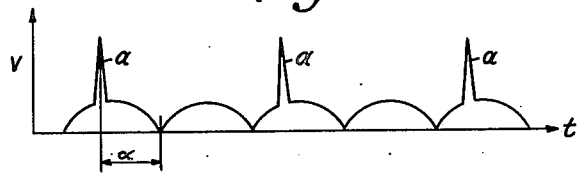
Fig. 5 is a curve showing the superposition of the reference impulses on the semi-sinusoids proceeding from the direction finding receiver for the purpose of a transmission to a central station.

In Fig. 5 is shown a curve corresponding to the output energy from rectifiers 5 and 18 of Fig. 2.

Although the present invention has been described for one example of embodiment, it is evident that it is by no means limited thereto, and that the same is capable of numerous variants and modifications without departing from the scope of the invention.

What I claim is:

1. A radio direction finder comprising a directive antenna system, means for effectively varying the directivity of said antenna system at a given frequency and deriving from an incoming radio wave a signal varying in amplitude as to undergo phase reversals in dependence on the direction of said wave and the frequency of said system, means for deriving impulses corresponding to the instants of phase reversal of said signal, a source of two-phase reference waves at said given frequency, means for separately amplitude modulating each of said impulses with a respective one of said reference waves, a cathode ray tube indicator comprising separate deflection elements, means for applying said modulated impulses to separate ones of said elements to produce an indication of the direction of said wave.

2. An arrangement according to claim 1, further comprising a source of carrier waves, means for further modulating each of said modulated impulse with said carrier waves of a given phase, means for combining said further modulated impulses with carrier waves of opposite phase and means for applying each of said combined impulses to separate deflection elements.

3. An arrangement according to claim 2, wherein said means for combining comprises means for adding.

4. In a radio direction finder comprising a directive antenna system, means for effectively rotating said system at a given frequency to derive a received radio signal pattern sinusoidally varying in amplitude in accordance with the direction of propagation of received signals, means for generating a two phase reference wave in synchronism with the effective rotation of said system, and means for rectifying and shaping said radio signal pattern to produce impulses of constant amplitude corresponding to the zero values of said derived radio signal pattern, an indicator circuit for providing a linear diametrical trace indicative of direction comprising means for separately combining said derived pulses with respective phases of said two phase signal to derive separate control voltages of respective amplitudes dependent upon the phase of said received signal pattern and the output phases of said two phase generator, a local oscillator, a cathode ray tube indicator comprising two sets of deflection elements, coupler circuits for separately coupling said local oscillator to each of said sets of deflection elements, and means for applying said control voltages to said coupler circuits to control the amplitude of the energy applied from said local oscillator to the respective deflection elements.

5. A direction finder according to claim 4, wherein the means for separately combining comprise two channels each channel including a series of electron tubes, the first tube in the series biased to zero and responsive jointly to the said impulses and the contemporaneous values of the said reference wave and having in its plate circuit a charging resistance and a circuit of high time constant comprising a condenser and high resistance and a diode for charging the condenser, and said coupler circuits each comprise two further tubes constituting a differential modulator, said local oscillator being connected to excite in push-pull the grids of the differential modulator tubes, one said modulator tube having feed connections from the said circuit or high time constant to bias its grid, the other said modulator tube having a fixed grid bias.

6. A direction finder according to claim 5, wherein the frequency of said local oscillator is independent of the frequency of the radiogoniometric apparatus and the two-phase generator.

JACQUES SELZ.

REFERENCES CITED

The following references are of record in the file of this patent:

UNITED STATES PATENTS

| Number | Name | Date |
| --- | --- | --- |
| 2,403,967 | Busignies | July 16, 1946 |
| 2,407,281 | Johnson et al. | Sept. 10, 1946 |